United States Patent

Hasing et al.

[11] Patent Number: 6,041,150
[45] Date of Patent: Mar. 21, 2000

[54] MULTIPASS CAVITY SENSOR FOR MEASURING A TISSUE-EQUIVALENT RADIATION DOSE

[75] Inventors: Friedrich Wolfgang Hasing, Jülich; Frank Pfeiffer, Nürnberg; Harald Büker, Jülich, all of Germany

[73] Assignee: Forschungszentrum Julich GmbH, Julich, Germany

[21] Appl. No.: 09/077,819

[22] PCT Filed: Dec. 2, 1996

[86] PCT No.: PCT/DE96/02321

§ 371 Date: Jun. 1, 1998

§ 102(e) Date: Jun. 1, 1998

[87] PCT Pub. No.: WO97/21112

PCT Pub. Date: Jun. 12, 1997

[30] Foreign Application Priority Data

Dec. 2, 1995 [DE] Germany ............... 195 45 060

[51] Int. Cl.$^7$ ....................................... G02B 6/00
[52] U.S. Cl. .................................................. 385/12
[58] Field of Search ........................ 385/30–37, 12–16

[56] References Cited

FOREIGN PATENT DOCUMENTS

| 0103835 | 3/1984 | European Pat. Off. . |
|---|---|---|
| 0416493 | 9/1990 | European Pat. Off. . |
| 0416493 | 3/1991 | European Pat. Off. . |
| 0678757 | 10/1995 | European Pat. Off. . |
| 2200984 | 8/1988 | United Kingdom . |

*Primary Examiner*—Akm E. Ullah
*Attorney, Agent, or Firm*—Herbert Dubno

[57] ABSTRACT

A sensor for a tissue-equivalent radiation dose comprises a light waveguide sensitive to radiation and in a field of radiation. The waveguide is mirrored at both ends so that the back and forth passage of light takes place a multiplicity of times and a light waveguide acts as a multipath cavity. The light is coupled into and out of the waveguide at an end thereof and the ends of the waveguide can be pointed.

4 Claims, 6 Drawing Sheets

MULTIPASS CAVITY SENSOR FOR MEASURING A TISSUE-EQUIVALENT RADIATION DOSE

SPECIFICATION

CROSS REFERENCE TO RELATED APPLICATIONS

This application is a national stage of PCT/DE/96/02321 filed Dec. 2, 1996 and based on German national application 195 45 060.4 of Dec. 2 1995 under International Convention.

The invention relates to a sensor having a radiation sensitive light waveguide for measuring a tissue equivalent radiation dose.

BACKGROUND OF THE INVENTION

From DE 39 29 294 A1, it is known to provide a mirror on such a light waveguide at one end and to couple light into it at the other end.

The light coupled into the light waveguide travels through it to the mirrored end, is reflected and travels back in the opposite direction through the light waveguide as a result.

The intensity of the reflected light is measured. If such a light waveguide is subjected to an ionizing radiation, the light damping in the waveguide is thus altered and so is the light intensity. The intensity change is a measurement of the radiation dose.

Light waveguides which, because of their composition, enable a tissue equivalent measurement of the radiation dose have a relatively low detection sensitivity.

The detection sensitivity can be increased by the use of long radiation-sensitive light waveguides. However, that increased detection sensitivity is connected with a correspondingly smaller local resolution.

In order to be able to measure approximate tissue equivalents with satisfactory local resolution and detection efficiency, according to German Patent application DE 195 03 647A1, two differently radiation-sensitive light waveguides are used.

However, the use of two waveguides, because of the large spatial requirements by comparison to a single waveguide also is detrimental with respect to the local resolution. Even here, proportionally longer light waveguides must be used with correspondingly poorer local resolution.

OBJECT OF THE INVENTION

The object of the invention is to provide a sensor for measuring a tissue equivalent dose which does not have the aforedescribed drawbacks.

SUMMARY OF THE INVENTION

The object is attained with a sensor for measuring a tissue-equivalent radiation dose which comprises a radiation-sensitive light waveguide, means for coupling the light into and out of the waveguide and mirroring provided on both ends of the radiation-sensitive light waveguides. The mirror on one or both ends of the radiation-sensitive light waveguide is formed as totally reflective. The radiation-sensitive light waveguide can have a pointed end and the point can be pyramidal.

As a tissue equivalent measurement radiation-sensitive light waveguide (sensor fiber), a glass fiber has been found to be suitable that is free from heavy doping elements. Suitable doping elements are especially lithium, magnesium and sodium.

The tissue equivalent measuring, radiation-sensitive light waveguide has on its end surface reflectors. To be able to couple light into and use of the light waveguide, it is especially provided that at least one end surface is only partly mirrored. Through the unmirrored part, the light can enter or leave the radiation-sensitive light waveguide.

By contrast to the state of the art represented by DE 39 29 294, only a part of the light coupled into the light waveguide is prematurely permitted to escape after traversing the radiation-sensitive light waveguide (back and forth travel with a fully mirrored end surface). The other part is reflected back and forth a multiplicity of times. The construction resembles a laser cavity. The light path is elongated in this manner and thus the sensitivity is improved.

The coupling of a sensor fiber (radiation sensitive light waveguide) to a radiation resistant transmission fiber cannot be carried out with the usual splicing methods of light waveguide technology since that would damage the mirror layer. In effect coupling is required to avoid direct reflection at the front mirror layer and to minimize leakage in the cavity. To insure a high precision coupling, the fiber to be coupled must be precisely aligned with the opening in the mirror on the one hand and on the other hand the fibers can have no radial offset. The opening can be aligned very quickly and precisely with an excimer laser. The positioning and fixing of the fibers can be effected in a V groove anisotropically etched in a monocrystalline silicon. It thus can be insured that both fibers lie on a single axis.

In an advantageous configuration of the invention, mirroring on one or both ends of the fiber can be formed so as to be totally reflective. For example, the radiation sensitive light waveguide has one totally reflecting end. Such a totally reflecting end is achieved when the light travelling through the radiation sensitive light waveguide encounters the totally reflective end surface (the surface of the totally reflective end) at such an angle of incidence that total reflection occurs based upon the law of reflection. The radiation sensitive light waveguide is then the optically more dense medium by comparison to the medium bounded by the totally reflective end surface.

To generate a total reflection, the totally reflective end can have especially the configuration of a point. Preferably the point includes a right angle. In that case, a section through the point will form an isosceles triangle with a right angle.

The provision of totally reflective mirroring avoids absorption losses which arise by conventional mirroring. The light in the radiation sensitive light waveguide can then be frequently reflected back and forth. The light path in the radiation sensitive light waveguide is longer by comparison to conventional mirroring so that the sensitivity is further increased. Light paths of up to 100 m are thus possible. The number of materials which can used for the radiation sensitive light waveguide is thus further increased. The expensive dielectric multilayer materials required in conventional mirroring are unnecessary. A totally reflective end is therefore economically producible. Advantageously, no significant temperature dependency of the reflection arises by comparison to conventional mirroring. In addition, light paths of up to 100 m are possible which determines the decay time of light pulses and the absolute damping in the radiation sensitive light waveguide. A distance-neutral measuring process can thus be obtained with the sensor of the invention.

Furthermore, with the totally reflective end of the invention, it is possible to produce in a simple and reproducible way a predetermined ratio of the mirrored part of one end face to the unmirrored part and to use the unmirrored part for the incoupling and outcoupling of the light into and out of the radiation sensitive light waveguide. This ratio effects proportionally the number of back and forth reflections in the radiation sensitive light waveguide. The greater the mirrored part in proportion to the incoupling and outcoupling part the more frequently the light will be reflected back and forth in the light sensitive waveguide.

The aforementioned ratio influences in a controlling manner the number of back and forth reflections in the radiation-sensitive light waveguide. The greater the reflective part in proportion to the in coupled and out coupled parts, the more frequently will the light be reflected back and forth in the radiation sensitive light waveguide.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
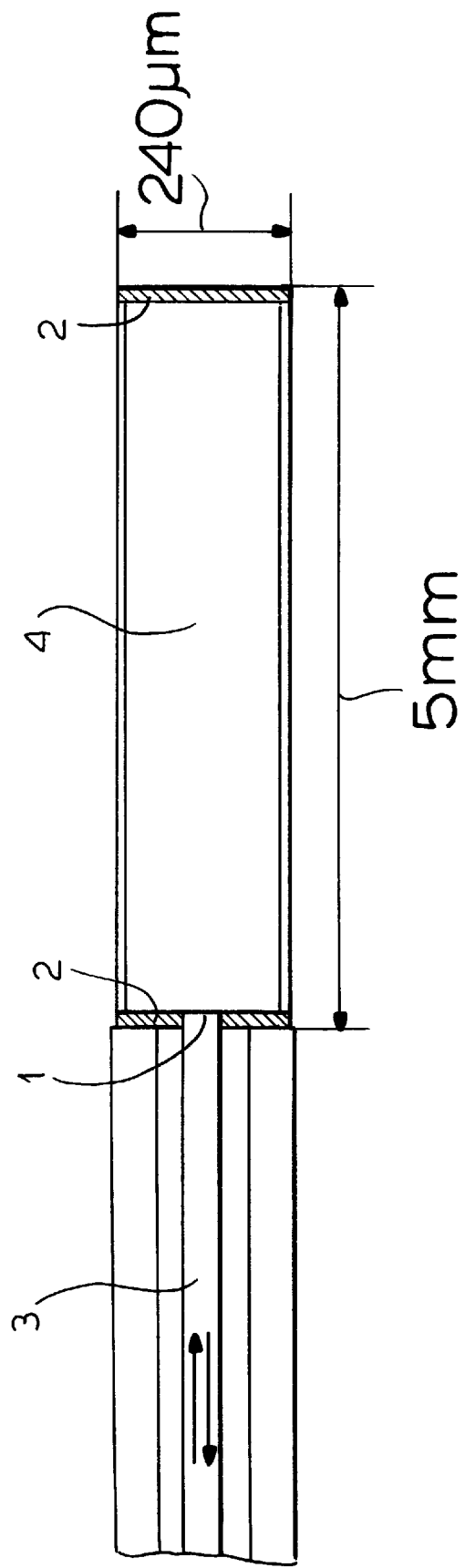
FIG. 1 is a diagrammatic section a sensor for measurement of a tissue-equivalent radiation dose.

FIG. 1 shows a radiation sensor light waveguide 4 which has reflectors 2 on its ends. One of the mirrors 2 has an opening 1. A radiation sensor transmitting fiber 3 is connected with the radiation-sensitive light waveguide 4 through the opening. Light can be coupled into and out of the radiation sensitive light waveguide 4 by the transmission fiber 3.

Instead of a single transmission fiber 3, a twin fiber can be used. The coupling in of the light and the outcoupling of the light is then effected via two separate fibers. Advantageously, Fresnel reflections at the boundary surface have no influence. Nevertheless the sensitivity is reduced, light can be coupled out through the incoupling fiber and can be lost for the measurement.

An analogous construction with one or two radiation resistant connection fibers can also be realized with thin glass rods which are prepared in the same manner. If one assumes the condition that a corresponding glass composition is provided, a close to tissue-equivalent indication is possible.

Figure 2:
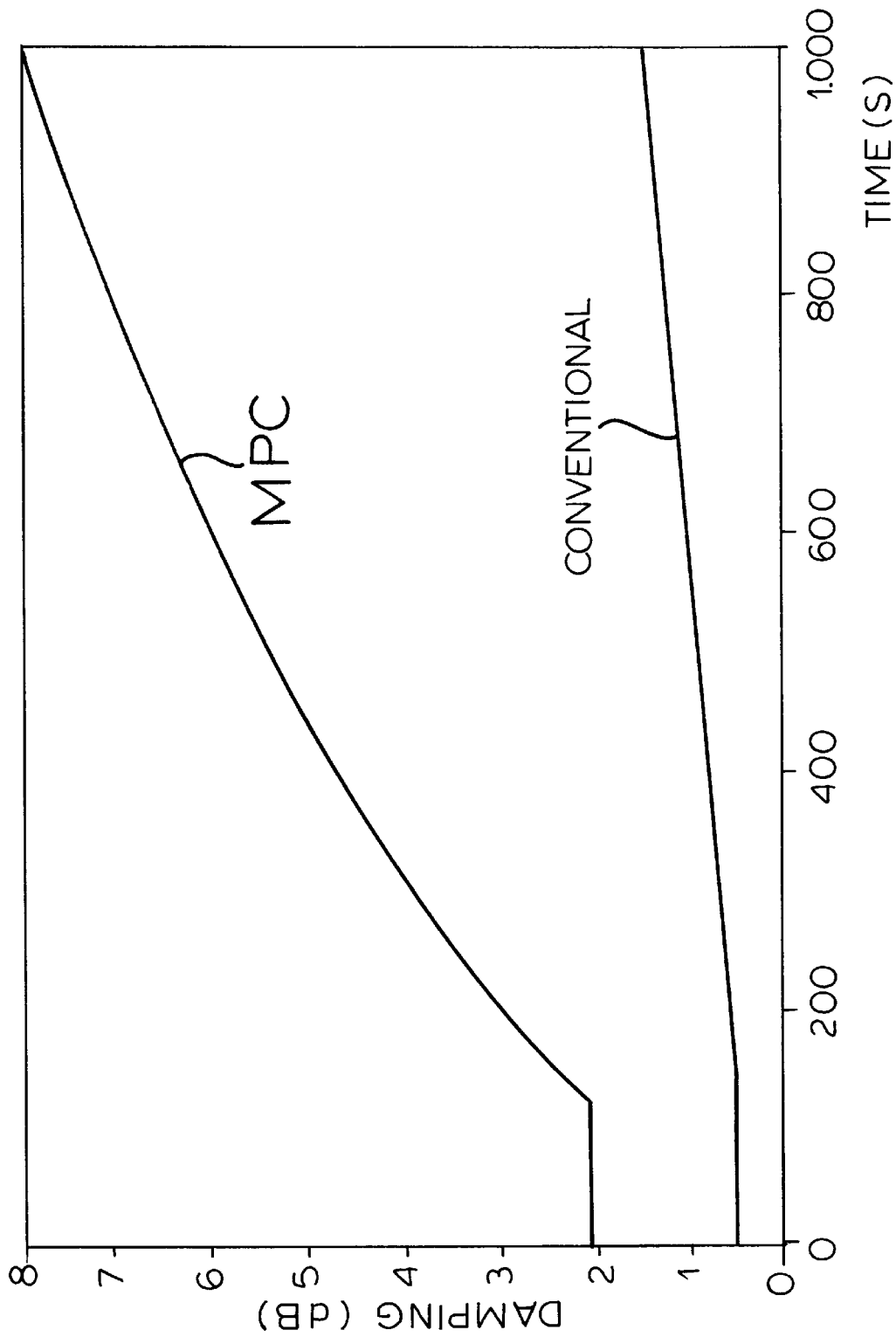
FIG. 2 is a graph showing a simulation of the radiation of the sensor according to the invention by comparison to a conventional sensor.

FIG. 2 illustrates the simulation of a measurement of radiation of the multipath sensor according to the invention (MPC) in comparison to a conventional sensor. The simulated radiation start is effected at t=120 s.

For both sensor fibers lengths of 5 mm are provided and a dosage of 1.1 Gy/min and a reflectivity of the mirror surfaces of 99% can be used. The ratio of opening 1 to the cross section of the radiation sensitive fiber 4 amounts to 0.055.

The induced damping is a function of the fiber length and the dosage and for the commercial design an effective sensitivity of 0.06 dB/Gy/cm is obtained and for the MPC sensor, 0.72 dB/Gy/cm.

The smaller the ratio of the opening 1 to the cross section of the radiation sensor fiber 4 the higher is the effective fiber sensitivity which one obtains. At the bottom, a limit is reached when the damping of the MPC becomes so great that no elongation of the light path occurs any longer. The damping of the cavity depends upon the fiber base damping, the reflectivity of the mirror and the ratio of the opening 1 to the cross section of the radiation sensitive fiber 4.

Figure 3:
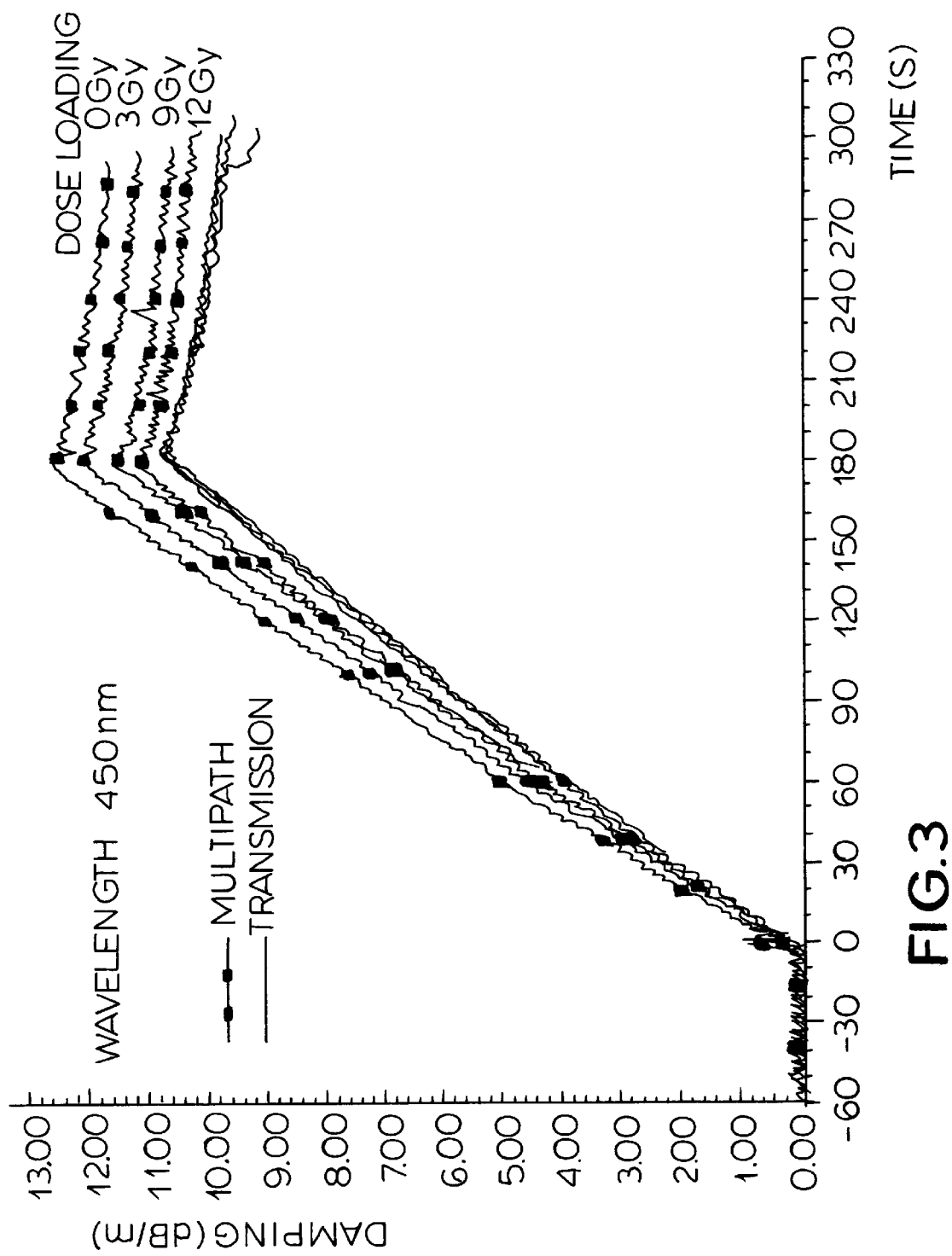
FIGS. 3–5 are graphs display experimental results.
Figure 4:
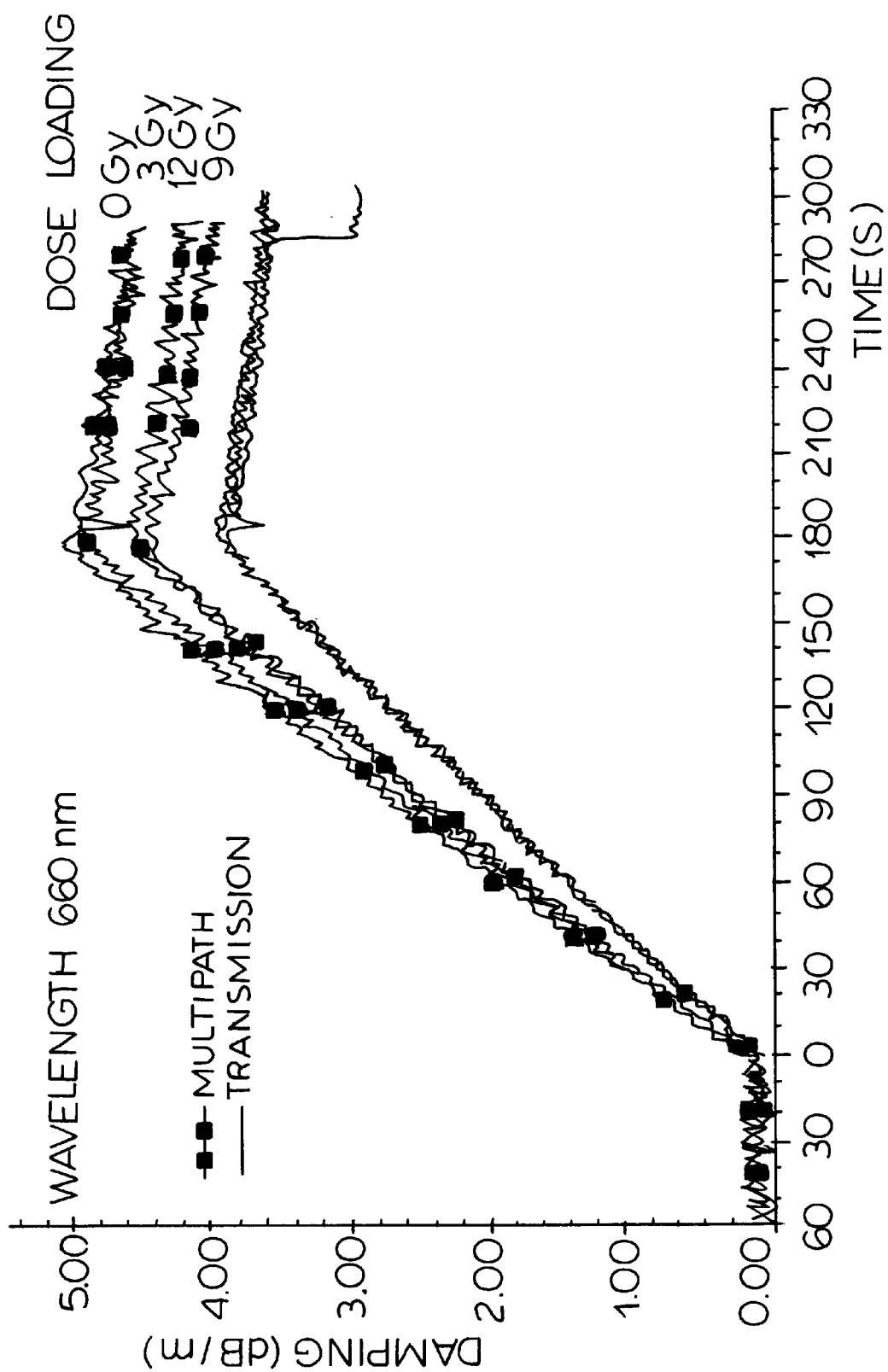
Figure 5:
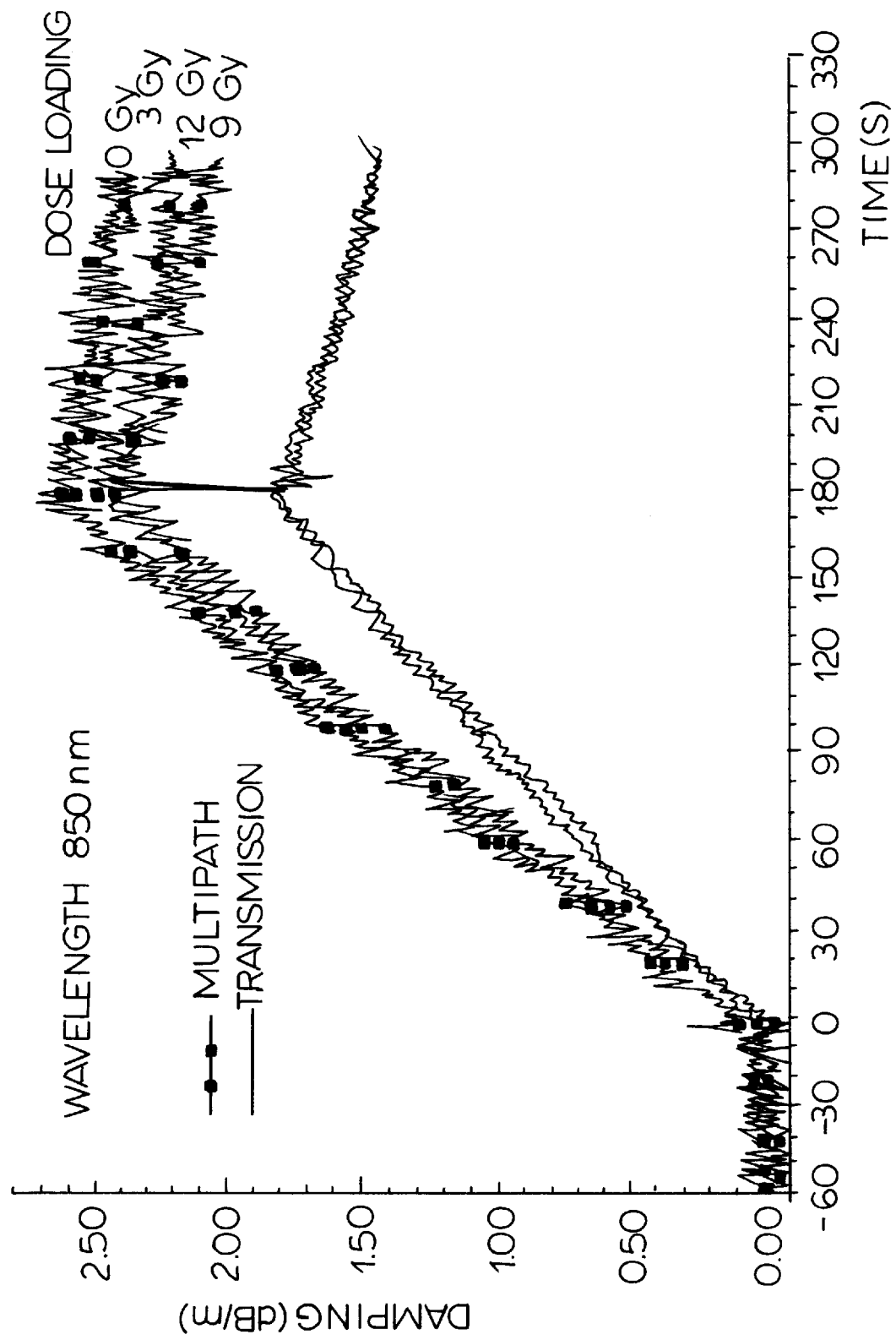

FIGS. 3–5 show three graphs which illustrate the results of irradiating two PbO transmission sensors with three different wavelengths. One of the transmission sensors is constructed in accordance with the principles of the multiple path cavity (MPC). This means that the cavity is mirrored on both sides but also that on both sides openings are provided enabling an incoupling for a transmission measurement. The effectivity of the cavity decreases positively. The experimental assembly is however facilitated.

The fiber length of the conventional transmission sensor amounts to 38.4 mm, the length of the cavity amounts to 51.0 mm. The measured damping is, however, normalized to a fiber length of one meter to enable a direct comparison. The radiation with photons of the energy 1, 2, 3 MeV begins at t=0 s. The dosage rate amounts to 1.0 Gy/min.

For this special sensor there is an increase in the fiber damping with the multipass cavity by 2 dB within a 3 minute irradiation with a wavelength of 450 nm. With increasing radiation loading of the fiber the detection sensitivity of the MPC falls more sharply by comparison with the conventional sensor since a reduced increase of the base damping reduces the transmission of the cavity. Such an arrangement is thus suitable for glass fibers with reduced detection sensitivity.

Clearly apparent is the fact that the difference in the detection sensitivities of both sensors increases with increase of the wavelength. The origin for this lies in the increased reflectivity of the damping in this region of the spectrum as well as the better transmission characteristics of the fiber in the infra red range.

In the figures, raw data checked for the fading effect is given.

Figure 6:
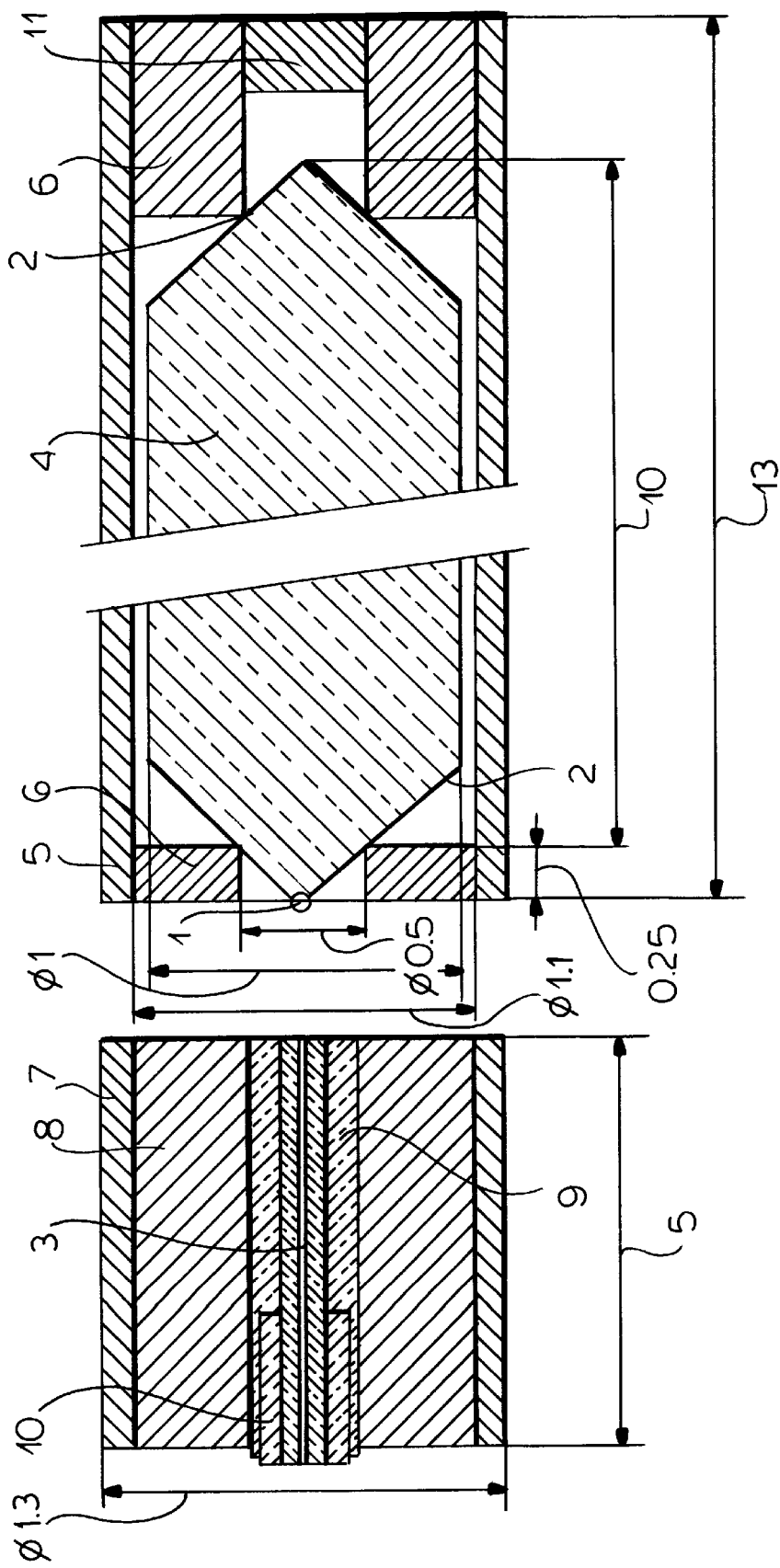
FIG. 6 is a cross sectional view showing a radiation sensitive light waveguide with totally reflecting ends.

FIG. 6 shows a sensor in a longitudinal section enlarged at a ratio of 50 to 1. The sensor has a radiation sensitive light waveguide 4 with totally reflective mirrored ends. The radiation light sensitive light waveguide 4 is comprised of a glass rod whose end faces 2 converge to points. The points include right angles. At the end faces 2, light found within the glass rod and which was radiated parallel to the longitudinal axis of the glass rod is totally reflected because of the refraction law.

For the incoupling of the light, at one end of the glass rod 4 the tip is ground perpendicular to the axis of the rod by a prism grinding. By this grinding a surface is formed. This surface is coupled to a monomode fiber 3. The surface resulting from the grinding has a ratio of 0.02:1 to the diameter of the glass rod so that an optimum overall arrangement is obtained.

The glass rod 4 is embedded in a protective outer tube 5 by receiving the end faces 2 into holding elements 6 with suitable dimensions and otherwise free from contact.

For incoupling to the fiber 3, the latter is initially centrally disposed in a tube 7 whose external radius corresponds to that of the tube 5 and which has ground ends. The embedding of the fiber 3 in the tube 7 is achieved with the fiber holder 8, the cement 9 and a fiber sheath 10.

Fiber 3 and glass rod 4 are appropriately adjusted and connected together via cementing or melting. For protection of the glass rod 4, the end not used for in-coupling is closed by means of a stopper 11.

If a light waveguide is used instead of a glass rod, the mounting at the end surfaces can be eliminated. Instead of a monomodal fiber it is suitable to use also a solid line multimode fiber 11.

We claim:

1. A sensor for measuring a tissue-equivalent radiation dose, comprising:

an elongated radiation-sensitive light waveguide disposed in an ionizing radiation field;

mirrors on opposite ends of said waveguide for multiple back and forth reflections of light from end to end within said waveguide whereby said waveguide forms a multipath cavity for light in said waveguide; and means for coupling light into and out of said waveguide.

2. The sensor defined in claim 1 wherein said mirroring is totally reflective.

3. The sensor defined in claim 1 wherein said waveguide has pointed ends.

4. The sensor defined in claim 3 wherein said pointed ends are pyramidal.

* * * * *